(12) United States Patent
Chen et al.

(10) Patent No.: US 11,054,550 B2
(45) Date of Patent: Jul. 6, 2021

(54) ANTI-REFLECTIVE FILM, POLARIZER COMPRISING THE SAME, AND IMAGE DISPLAY COMPRISING THE ANTI-REFLECTIVE FILM AND/OR THE POLARIZER COMPRISING THE SAME

(71) Applicant: BenQ Materials Corporation, Taoyuan (TW)

(72) Inventors: Ching-Huang Chen, Taoyuan (TW); Kuo-Hsuan Yu, Taoyuan (TW); Gang-Lun Fan, Taoyuan (TW)

(73) Assignee: BenQ Materials Corporation, Taoyuan (TW)

(*) Notice: Subject to any disclaimer, the term of this patent is extended or adjusted under 35 U.S.C. 154(b) by 155 days.

(21) Appl. No.: 16/265,861

(22) Filed: Feb. 1, 2019

(65) Prior Publication Data
US 2020/0041695 A1    Feb. 6, 2020

(30) Foreign Application Priority Data
Aug. 2, 2018 (TW) ................................. 107126964

(51) Int. Cl.
| | |
|---|---|
| *G02B 1/111* | (2015.01) |
| *G02B 1/14* | (2015.01) |
| *C09D 5/00* | (2006.01) |
| *C09D 7/40* | (2018.01) |
| *C09D 135/02* | (2006.01) |
| *C09D 175/14* | (2006.01) |
| *C09D 7/47* | (2018.01) |
| *C08G 77/20* | (2006.01) |
| *C08G 77/14* | (2006.01) |
| *C08F 290/06* | (2006.01) |
| *C09D 183/08* | (2006.01) |
| *C08F 2/48* | (2006.01) |
| *C08F 222/10* | (2006.01) |
| *C08G 77/46* | (2006.01) |
| *C09D 183/06* | (2006.01) |
| *C08G 77/24* | (2006.01) |
| *C09D 183/12* | (2006.01) |
| *C09D 175/16* | (2006.01) |
| *G02B 5/30* | (2006.01) |
| *C08K 3/36* | (2006.01) |

(52) U.S. Cl.
CPC ................ *G02B 1/111* (2013.01); *C08F 2/48* (2013.01); *C08F 222/1065* (2020.02); *C08F 290/067* (2013.01); *C08F 290/068* (2013.01); *C08G 77/14* (2013.01); *C08G 77/20* (2013.01); *C08G 77/24* (2013.01); *C08G 77/46* (2013.01); *C09D 5/002* (2013.01); *C09D 5/006* (2013.01); *C09D 7/47* (2018.01); *C09D 7/67* (2018.01); *C09D 7/70* (2018.01); *C09D 135/02* (2013.01); *C09D 175/14* (2013.01); *C09D 175/16* (2013.01); *C09D 183/06* (2013.01); *C09D 183/08* (2013.01); *C09D 183/12* (2013.01); *G02B 1/14* (2015.01); *C08K 3/36* (2013.01); *C08K 2201/011* (2013.01); *G02B 5/3033* (2013.01)

(58) Field of Classification Search
CPC .......... G02B 1/11; G02B 1/111; G02B 1/114; C09D 175/14; C09D 175/16; C09D 135/02
See application file for complete search history.

(56) References Cited

U.S. PATENT DOCUMENTS

| | | | | |
|---|---|---|---|---|
| 2008/0260997 A1* | 10/2008 | Iwata | .................... | G02B 5/0278 428/141 |
| 2009/0176077 A1* | 7/2009 | Horio | ..................... | G02B 1/105 428/217 |
| 2010/0020398 A1* | 1/2010 | Horio | ....................... | C08J 7/043 359/488.01 |
| 2010/0165460 A1* | 7/2010 | Furui | ....................... | G02B 1/14 359/488.01 |
| 2011/0159285 A1* | 6/2011 | Choi | ................... | C08G 18/7837 428/375 |
| 2014/0044891 A1* | 2/2014 | Shibata | ................ | G02B 5/3083 428/1.31 |
| 2014/0247486 A1* | 9/2014 | Shibata | .................... | G02B 1/11 359/488.01 |
| 2014/0248478 A1* | 9/2014 | Saito | ........................ | C08J 7/042 428/215 |
| 2015/0140279 A1* | 5/2015 | Kang | ....................... | C09D 4/00 428/174 |

(Continued)

FOREIGN PATENT DOCUMENTS

| | | |
|---|---|---|
| CN | 102382291 A | 3/2012 |
| CN | 103765249 A | 4/2014 |

(Continued)

OTHER PUBLICATIONS

Derwent Abstract of JP 2001/233611 A (appended to the reference) (Year: 2001).*

(Continued)

*Primary Examiner* — Z. Jim Yang

(57) ABSTRACT

The invention is to provide an anti-reflective film. The anti-reflective film comprises a substrate, a hard coating layer disposed on the substrate and a low refractive layer disposed on the hard coating layer. The low refractive layer comprises a (meth)acrylate resin, hollow silica nanoparticles, an initiator and a leveling agent. Wherein the leveling agent comprises a (meth)acrylic-modified organosilicone compound having a perfluoropolyether group. The reflectivity of the anti-reflective film of the present invention is in the range of 1.2% to 1.4%.

12 Claims, No Drawings

(56) References Cited

U.S. PATENT DOCUMENTS

| | | | | |
|---|---|---|---|---|
| 2015/0252207 A1* | 9/2015 | Ishikawa | ................ | C09D 4/00 428/337 |
| 2015/0355386 A1* | 12/2015 | Horii | .................. | G02B 5/0221 359/487.02 |
| 2016/0033042 A1* | 2/2016 | Minagawa | ............ | F16J 15/108 277/654 |
| 2016/0145449 A1* | 5/2016 | Hilgers | ................... | C09D 4/00 428/327 |
| 2017/0131439 A1* | 5/2017 | Kobori | ................... | C08J 7/044 |
| 2018/0094161 A1* | 4/2018 | Lee | ...................... | C09D 133/06 |
| 2018/0148609 A1* | 5/2018 | Ono | ......................... | B32B 7/12 |
| 2018/0329125 A1* | 11/2018 | Hikita | ...................... | G09F 9/30 |
| 2019/0211168 A1* | 7/2019 | Thompson | ............. | B32B 27/08 |
| 2019/0321850 A1* | 10/2019 | Song | ................... | C09D 175/04 |
| 2019/0322896 A1* | 10/2019 | Song | ...................... | C08J 7/0427 |
| 2019/0324173 A1* | 10/2019 | Saito | ...................... | G02B 1/111 |
| 2019/0337273 A1* | 11/2019 | An | .......................... | B32B 27/08 |
| 2019/0359775 A1* | 11/2019 | Ezoe | .................... | C08G 77/442 |
| 2020/0192001 A1* | 6/2020 | Sakakibara | .............. | G02B 1/14 |
| 2020/0398541 A1* | 12/2020 | Fujimoto | ................. | C09D 7/63 |

FOREIGN PATENT DOCUMENTS

| | | | | |
|---|---|---|---|---|
| CN | 104379620 A | | 2/2015 | |
| CN | 106662691 A | | 5/2017 | |
| JP | 2001233611 A | * | 8/2001 | |
| WO | WO-2014022363 A2 | * | 2/2014 | ........... C09D 133/16 |
| WO | WO-2018135099 A1 | * | 7/2018 | ............... B05D 7/24 |

OTHER PUBLICATIONS

Machine translation of WO 2018/135099 A1, obtained from EspaceNet (Year: 2020).*

* cited by examiner

ANTI-REFLECTIVE FILM, POLARIZER COMPRISING THE SAME, AND IMAGE DISPLAY COMPRISING THE ANTI-REFLECTIVE FILM AND/OR THE POLARIZER COMPRISING THE SAME

CROSS-REFERENCE TO RELATED APPLICATION

This application claims the priority benefit of Taiwanese application serial No. 107126964, filed on, Aug. 2, 2018, which is incorporated herein by reference.

BACKGROUND OF THE INVENTION

Field of the Invention

The present invention relates to an anti-reflective film for display, and particularly relates to an anti-reflective film with enhanced abrasion resistance. The present invention further relates to a polarizer with the present anti-reflective film and a display device with the present anti-reflective film and/or the polarizer with the anti-reflective film.

Description of the Prior Art

A display, such as cathode ray tube display (CRT), liquid crystal display (LCD), plasma display (PDP), electroluminescent display (ELD), field emission display (FED), organic light emitting diode display (OLED) is desired to eliminate the reflection of the external light on the display screen for improving the image quality. An anti-reflective film with an low-refractive layer on a transparent substrate is introduced to improve the reflection of the display screen surface to improve the image quality.

The anti-reflective film is a low refractive layer disposed on a transparent substrate, and the refractivity of the low refractive layer is lower than that of the transparent substrate. The refractivity of the low refractive layer must be lower enough to enhance the reflection of the anti-reflective film.

Recently, due to the higher image quality requirements on the display, the quality of the anti-reflective film is also required. Furthermore, since the anti-reflective film is disposed on the surface of the display screen, the hardness and abrasion resistance of the anti-reflection film has to be considered except for the requirements of light transmittance and anti-reflection to provide the display with a good image quality. Therefore, an anti-reflective film with a satisfied hardness and abrasion resistance is demanded.

SUMMARY OF THE INVENTION

The object of the present invention is directed to provide an anti-reflective film comprising a substrate, a hard coating layer coated on the substrate and a low refractive layer on the hard coating layer. The low refractive layer comprises a (meth)acrylate resin, hollow silica nanoparticles, an initiator and a leveling agent, wherein the leveling agent comprises a perfluoropolyether group-containing (meth)acrylic-modified organosilicone compound. The reflectivity of the present anti-reflective film is ranging between 1.2% and 1.4%.

In an embodiment of the anti-reflective film of the present invention, the leveling agent used in the low refractive layer is a perfluoropolyether group-containing (meth)acrylic-modified organosilicone compound represented by the following formula (I) or represented by the following formula (II):

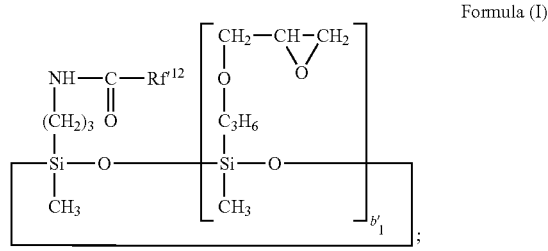

Formula (I)

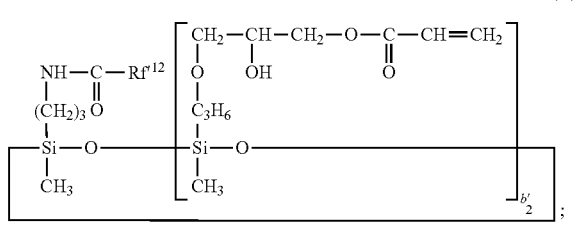

Formula (II)

wherein $b'_1+b'_2$ is ranging between 2 and 6.5, and $Rf^{12}$ is represented by the following formula:

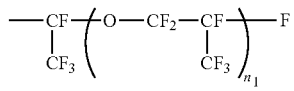

wherein n1 is ranging between 2 and 100.

In an embodiment of the anti-reflective film of the present invention, the number average molecular weight (Mn) of the perfluoropolyether group-containing (meth)acrylic-modified organosilicone compound in the leveling agent is ranging between 1,500 and 16,000.

In an embodiment of the anti-reflective film of the present invention, the amount of the leveling agent used in low refractive layer is ranging from 5 weight parts to 20 weight parts relative to per 100 weight parts of (meth)acrylate resin, and preferably ranging from 9 weight parts to 17 weight parts.

In an embodiment of the anti-reflective film of the present invention, the (meth)acrylate resin used in the low refractive layer can be selected from at least one of group consisting of pentaerythritol tri(meth)acrylate, dipentaerythritol hexa(meth)acrylate, pentaerythritol tetra(meth)acrylate, dipentaerythritol penta(meth)acrylate, trimethylolpropane tri(meth)acrylate, ditrimethylolpropane tetra(meth)acrylate and dipentaerythritol tetra(meth)acrylate, or combinations thereof.

In an embodiment of the anti-reflective film of the present invention, the particle diameter of the hollow silica nanoparticles used in the low refractive layer is ranging from 50 nm to 100 nm.

In an embodiment of the anti-reflective film of the present invention, the amount of the hollow silica nanoparticles used in the low refractive layer is ranging from 60 weight parts to 130 weight parts relative to per 100 weight parts of (meth)acrylate resin, and preferably ranging from 80 weight parts to 110 weight parts.

In an embodiment of the anti-reflective film of the present invention, the initiator used in the low refractive layer can be selected from at least one of the group consisting of hydroxycyclohexyl phenyl ketone, dipheny(2,4,6-trimethylbenzoyl) phosphine oxide, 2-hydroxy-2-methyl-1-phenyl-1-propanone, 2-methyl-1-[4-(methylthio)phenyl]-2-morpholinopropan-1-one, oligo[2-hydroxy-2-methyl-1-[4-(1-methylvinyl)enyl]propanone] and 2-hydroxy-1-[4-[4-(2-hydroxy-2-methylpropanoyl)phenoxy]phenyl]-2-methylpropan-1-one, or combinations thereof.

In an embodiment of the anti-reflective film of the present invention, the amount of the initiator used in the low refractive layer is ranging from 1.5 weight parts to 20 weight parts relative to per 100 weight parts of (meth)acrylate resin, and preferably ranging from 2 weight parts to 17 weight parts.

In an embodiment of the anti-reflective film of the present invention, the hard coating layer on the substrate comprises a urethane (meth)acrylate oligomer and an initiator.

In an embodiment of the anti-reflective film of the present invention, the number molecular weight of the urethane (meth)acrylate oligomer used in the hard coating layer is greater than 1,800, and preferably in the range of 1,800 to 4,500, and the viscosity of the oligomer at 25° C. is greater than 45,000 cps, and preferably ranging from 45,000 cps to 1,300,000 cps.

In an embodiment of the present invention, the hard coating layer can further comprise at least one of (meth) acrylate monomer, organic micro particles, silica nanoparticles and a leveling agent.

A further object of the present invention is to provide a polarizer comprising a polarizing element, wherein the polarizer comprises an anti-reflective film as above formed thereon.

A yet further object of the present invention is to provide a display comprising an anti-reflective film as above on the surface of the display.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF THE INVENTION

In the following detailed description, for purposes of explanation, numerous specific details are set forth in order to provide a thorough understanding of the disclosed embodiments. It will be apparent, however, that one or more embodiments may be practiced without these specific details.

It is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

The term "(meth)acrylate" used herein refers to acrylate or (meth)acrylate.

The present invention is to provide an anti-reflective film with sufficient hardness and abrasion resistance. The anti-reflective film of the present invention comprises a substrate, a hard coating layer and a low refractive layer. The reflectivity of the present anti-reflective film is ranging between 1.2% and 1.4%.

The substrate suitably used in the anti-reflective film of the present invention can be the film with good mechanical strength and light transmittance. The example of the substrate can be but not limited to polymethyl methacrylate (PMMA), polyethylene terephthalate (PET), polyethylene naphthalate (PEN), polycarbonate (PC), triacetate cellulose (TAC), polyimide (PI), polyethylene (PE), polypropylene (PP), polyvinyl alcohol (PVA), polyvinyl chloride (PVC) or cyclic olefin copolymer (COC) and the like.

In a preferred embodiment of the present invention, the light transmittance of the substrate is more than 80% and preferably is more than 90%. The thickness of the substrate used in the present anti-reflective film is ranging between 10 μm and 500 μm, and preferably ranging between 15 μm and 250 μm, and more preferably ranging between 20 μm and 100 μm.

In the present invention, the hard coating layer is formed on a substrate. The term "hard coating layer" used herein refers to a hard coating layer with pencil hardness not less than 2H according to JIS standard K5400. In addition, the thickness of the hard coating layer is, for example, ranging from 0.1 μm to 100 μm, and preferably ranging from 1.0 μm to 10 μm.

The hard coating layer of the present invention is a transparent coating layer. The resin used in the coating layer can be a radiation curable or electron beam curable (meth) acrylate resin, for example but not limited to urethane (meth)acrylate oligomer, polyester (meth)acrylate oligomer, polyurethane(meth)acrylate oligomer, epoxy (meth)acrylate oligomer, melamine (meth)acrylate oligomer, polyfluoroalkyl (meth)acrylate oligomer or silicone (meth)acrylate oligomer and the like. In an embodiment of the present invention, the radiation curable or electron beam curable acrylate resin can be a urethane (meth)acrylate oligomer with a functionality not less than 6 and preferably ranging from 6 to 15, a number average molecular weight not less than 1,800 and preferably ranging from 1,800 to 4,500, and a viscosity at 25° C. of more than 45,000 cps and preferably ranging from 45,000 cps to 1,300,000 cps. If the functionality or the molecular weight of the (meth)acrylate resin used in the hard coating layer is less than above-mentioned, the adhesion between the hard coating layer and substrate of the anti-reflective film will be adversely affected. If the viscosity of the (meth)acrylate resin used in the hard coating layer is too low, the abrasion resistance of the anti-reflective film will be insufficient.

The initiator suitably used in the hard coating layer for the anti-reflective film of the present invention can be selected from those commonly used in the related art, such as, for example, but not limited to, acetophenones, diphenylketones, propiophenones, benzophenones, α-hydroxyketones, fluorenylphosphine oxides and the like. The above-mentioned initiators can be used alone or in combination.

Furthermore, for enhancing curability and hardness, the present hard coating layer can optionally be added with one or more (meth)acrylate monomers, such as, for example, but not limited to 2-ethylhexyl (meth)acrylate (2-EH(M)A), 2-hydroxyethyl (meth)acrylate (HE(M)A), 2-hydroxypropyl (meth)acrylate, (HP(M)A), 2-hydroxybutyl (meth)acrylate, (HB(M)A), 2-butoxy ethyl (meth)acrylate, 1,6-hexanediol di(meth)acrylate (HDD(M)A), cyclic trimethylolpropane formal (meth)acrylate (CTF(M)A), 2-phenoxyethyl (meth)acrylate, (PHE(M)A), tetrahydrofurfuryl (meth)acrylate (THF(M)A), lauryl (meth)acrylate (L(M)A), diethylene glycol di(meth)acrylate (DEGD(M)A), dipropylene glycol di(meth)acrylate, (DPGD(M)A), tripropylene glycol di(meth)acrylate (TPGD(M)A), pentaerythritol di(meth)acrylate (PED(M)A), dipentaerythritol hexa(meth)acrylate (DPH(M)A), trimethylolpropane tri(meth)acrylate (TMPT(M)A), pentaerythritol tri(meth)acrylate (PET(M)A), isobornyl (meth)acrylate (IBO(M)A), pentaerythritol tetra(meth)acrylate (PETE(M)A), dipentaerythritol penta(meth)acrylate (DPP(M)A), ditrimethylolpropane tetra(meth)acrylate (DTMPTT(M)A) and the like.

The hard coating layer of the present anti-reflective film can optionally be incorporated with a re-coatable fluorine, (meth)acrylate or organosilicone leveling agent. The leveling agent incorporated into the hard coating layer is used to enhance the surface coverage and smoothness of the coating layer and thus, the surface of the low reflective layer obtained after drying can be a smooth one with antifouling and abrasion resistance. The hard coating layer can be further coated with a low refractive layer.

In further an embodiment of the present invention, the hard coating layer can optionally comprises silica nanoparticles or organic microparticles to form an irregular surface for providing the hard coating layer with an anti-glare property.

In the hard coating layer of the present anti-reflective film, the suitable silica nanoparticles have a primary particle diameter ($d_{50}$) of 5 nm to 30 nm and a secondary particle diameter ($d_{50}$) of 50 nm to 120 nm. In an embodiment of the present invention, the amount of the silica nanoparticles used in the hard coating layer is ranging from 0.2 weight percent (wt %) to 12 weight percent (wt %).

In the hard coating layer of the present anti-reflective film, the suitable organic microparticles can be hydrophilic-modified or unmodified organic micoparticles of polymethyl methacrylate, polystyrene, styrene-methyl methacrylate copolymer, polyethylene, epoxy resin, polysilicone, polyvinylidene fluoride or polyvinyl fluoride resin. The particle diameter of the microparticles is less than 5 μm and preferably ranging between 1 μm and 5 μm. In a preferred embodiment of the present invention, for enhancing the dispersion of the organic microparticles in the hard coating layer, the surface of the organic microparticles can be hydrophilic-modified by 2-hydroxyethyl (meth)acrylate (2-HE(M)A) or (meth)acrylonitrile. The preferred hydrophilic-modified organic microparticles can be hydrophilic-modified polymethyl methacrylate, polystyrene, or styrene-methyl methacrylate copolymer microparticles. Furthermore, the amount of the organic microparticles used in the hard coating layer will affect the anti-glare property thereof, the amount of the organic microparticles used in the hard coating layer is ranging from 0.3 weight percent to 12 weight percent.

The refractive index of low refractive layer of the present anti-reflective film is lower than that of the substrate or the hard coating layer made of the present anti-reflective film. The low refractive layer disposed on the hard coating layer comprises a (meth)acrylate resin, hollow silica nanoparticles, an initiator and a leveling agent, wherein the leveling agent comprises a perfluoropolyether group-containing (meth)acrylic-modified organosilicone compound.

The (meth)acrylate resin suitable used in the low refractive layer of the anti-reflective film of the present invention can be but not limited to, for example pentaerythritol tri(meth)acrylate, dipentaerythritol hexa(meth)acrylate, pentaerythritol tetra(meth)acrylate, dipentaerythritol penta(meth)acrylate, trimethylolpropane tri(meth)acrylate, ditrimethylolpropane tetra(meth)acrylate and dipentaerythritol tetra(meth)acrylate or combinations thereof.

The hollow silica nanoparticles in the low refractive layer of the present anti-reflective film is used for enhancing the film strength and lowering the refraction of the low refractive layer. The term "hollow silica nanoparticles" used herein is directed to a structure with air cavities and/or a porous structure. In an embodiment of the present invention, the average particle diameter of the hollow silica nanoparticles is ranging between 50 nm and 100 nm, and preferably ranging between 50 nm and 80 nm. The amount of the hollow silica nanoparticles is ranging from 60 weight parts to 130 weight parts relative to 100 weight parts of the (meth)acrylate resin, and preferably ranging from 80 weight parts to 110 weight parts relative to 100 weight parts of the (meth)acrylate resin.

In an embodiment of the anti-reflective film of the present invention, the leveling agent used in the low reflective layer is a perfluoropolyether group-containing (meth)acrylic-modified organosilicone compound represented by the following formula (I) or a compound represented by the following formula (II):

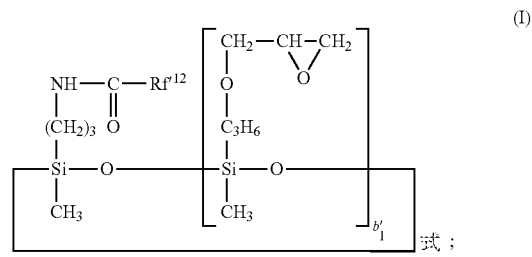

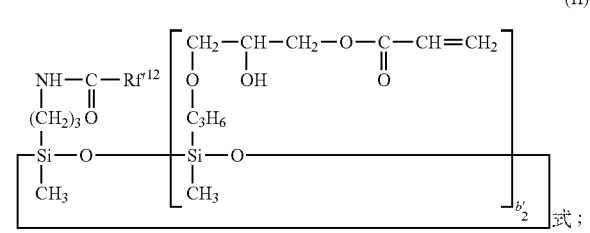

wherein b'$_1$+b'$_2$ is ranging between 2 and 6.5, and Rf$^{12}$ is represented by the following formula:

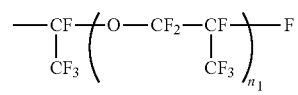

wherein n1 is ranging between 2 and 100.

The low reflective layer of the anti-reflective film of the present invention can be added with a perfluoropolyether group-containing (meth)acrylic-modified organosilicone compound used as a leveling agent for enhancing the surface coverage and smoothness of the coating layer and thus, the surface of the low reflective layer obtained after drying can be one with smoothness, antifouling and abrasion resistance.

In an embodiment of the anti-reflective film of the present invention, the number average molecular weight of the perfluoropolyether group-containing (meth)acrylic-modified organosilicone compound is ranging between 1,500 and 16,000, and preferably ranging between 3,500 and 7,000. The content of the leveling agent comprising perfluoropolyether group-containing (meth)acrylic-modified organosilicone compound is ranging from 5 weight parts to 20 weight parts relative to per 100 weight parts of (meth)acrylate resin, and preferably ranging from 8 weight parts to 17 weight parts. When the content of the leveling agent comprising perfluoropolyether group-containing (meth)acrylic-modified organosilicone compound is excess or insufficient, it will have adverse effect on the abrasion resistance of the anti-reflective film.

The initiator suitably used in the low reflective layer of the present invention can be the initiators commonly used in the related art, such as, but not limited to, for example, hydroxy-cyclohexyl phenyl ketone, dipheny(2,4,6-trimethylbenzoyl) phosphine oxide, 2-hydroxy-2-methyl-1phenylacetone, 2-methyl-1-[4-(methylthio)phenyl]-2-morpholinopropan-1-one, oligo[2-hydroxy-2-methyl-1-[4-(1-methylvinyl)phenyl]propanone] and 2-hydroxy-1-[4-[4-(2-hydroxy-2-methylpropanoyl)phenoxy]phenyl]-2-methylpropan-1-one or combinations thereof. In an embodiment of the present invention, the amount of the initiator used in the reflective film is ranging from 1.5 weight parts to 20 weight parts relative to per 100 weight parts of the (meth)acrylate resin, and preferably ranging from 2 weight parts to 17 weight parts. When the content of the initiator is excess or insufficient, it will have adverse effect on the abrasion resistance of the anti-reflective film.

The preparation of anti-reflective film of the present invention comprises the steps of mixing the urethane(meth) acrylate oligomer, initiator and suitable solvent to generate a hard coating solution, wherein the hard coating solution can optionally be added with (meth)acrylate monomers, organic particles, silica nanoparticles, or a leveling agent; coating the hard coating solution on a substrate, drying to remove the solvent, and curing by radiation or electron beam to form a hard coating layer on the substrate; mixing a (meth)acrylate resin, hollow silica nanoparticles, an initiator, a leveling agent comprising the above perfluoropolyether group-containing (meth)acrylic-modified organosilicone compound and a suitable solvent to obtain a low refractive solution; and coating the low refractive solution on the hard coating layer and drying to remove the solvent and curing to form a low refractive layer on the hard coating layer by radiation and electron beam.

The solvents suitable for preparation of the present anti-reflective film can be the organic solvents commonly used in the related art, such as ketones, aliphatic, cycloaliphatic or aromatic hydrocarbons, ethers, esters or alcohols. The hard coating solution and the low refractive solution can use one or more organic solvents. The suitable organic solvent can be such as, acetone, butanone, cyclohexanone, methyl isobutyl ketone, hexane, cyclohexane, dichloromethane, dichloroethane, toluene, xylene, propylene glycol methyl ether, methyl acetate, ethyl acetate, propyl acetate, butyl acetate, n-butanol, isobutanol, isopropanol, diacetone alcohol, propylene glycol methyl ether acetate, cyclohexanol or tetrahydrofuran and the likes.

The hard coating solution and the low refractive layer can be applied to the substrate surface by any usual method in the related art, for example, bar coating, doctor blade coating, dip coating, roll coating, spinning coating, slot-die coating and the like.

The further object of the present invention is to provide a polarizer comprising a polarizing element, wherein the surface of the polarizer comprises an anti-reflective film thereon.

A yet further object of the present invention is to provide a display comprising an anti-reflective film and/or a polarizer as above on the surface of the display.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

EXAMPLE

Preparation Example 1: Preparation of the Hard Coating Film 45 weight parts of urethane acrylate oligomer (functionality 9, molecular weight about 2,000, viscosity 86,000 cps at 25° C., commercially obtained from Allnex, USA), 4.5 weight parts of pentaerythritol triacrylate (PETA), 12 weight parts of dipentaerythritol hexaacrylate (DPHA), 4 weight parts of photoinitiator (Chemcure-481, commercially obtained from Chembridge, Taiwan), 24.5 weight parts of ethyl acetate and 75 weight parts of n-butyl acetate were mixed and stirred for 1 hour to generate a hard coating solution. Next, the prepared hard coating solution was wirebar-coated on a PMMA film with a thickness of 40 μm. After the resulting coating layer was dried at 100° C. for 30 seconds in an oven, the layer was cured by exposure to UV light in a cumulative dosage of 40 mJ/cm$^2$ under nitrogen atmosphere. Thus, a hard coating film comprising a hard coating layer with a thickness of 5 μm formed on the substrate was obtained.

Preparation Example 2: Preparation of the Hard Coating Film 39 weight parts of urethane acrylate oligomer (functionality 9, molecular weight about 2,000, viscosity 86,000 cps at 25° C., commercially obtained from Allnex, USA), 4.5 weight parts of pentaerythritol triacrylate (PETA), 12 weight parts of dipentaerythritol hexaacrylate (DPHA), 6 weight parts of cyclictrimethylolpropane formal acrylate (CTFA), 4 weight parts of photoinitiator (Chemcure-481, commercially obtained from Chembridge, Taiwan), 24.5 weight parts of ethyl acetate (EAC) and 75 weight parts of n-butyl acetate (nBAC) were mixed and stirred for 1 hour to generate a hard coating solution. Next, the prepared hard coating solution was wirebar-coated on a PMMA film with a thickness of 40 μm. After the resulting coating layer was dried at 90° C. for 30 seconds in an oven, the layer was cured by exposure to UV light in a cumulative dosage of 40 mJ/cm$^2$ under nitrogen atmosphere. Thus, a hard coating film comprising a hard coat layer with a thickness of 5 μm formed on the substrate was obtained.

Preparation Example 3: Preparation of the Anti-Glare Hard Coating Film 405 weight parts of urethane acrylate oligomer (functionality 9, molecular weight about 2,000, viscosity 86,000 cps at 25° C., commercially obtained from Allnex, USA), 45 weight parts of pentaerythritol triacrylate (PETA), 105 weight parts of dipentaerythritol hexaacrylate (DPHA), 45 weight parts of hexanediol diacrylate (HDDA), 15 weight parts of 2-phenoxyethyl acrylate (PHEA), 35 weight parts of photoinitiator (Chemcure-481, commercially obtained from Chembridge, Taiwan), 5 weight parts of photoinitiator (TR-PPI-one, commercially obtained from Tronly New Electronic Materials, Hong Kong), 245 weight parts of ethyl acetate and 100 weight parts of n-butyl acetate were mixed and stirred for 1 hour to generate a hard coating solution.

600 weight parts of the above-prepared hard coating solution, 10.9 weight parts of reactive silica nanoparticles dispersion (MEK-5630X, solid content 30%, solvent: butanone, commercially obtained from EVONIK United Silica Industrial, Taiwan), 4 weight parts of silica nanoparticles dispersion (NanoBYK-3650, solid content 30%, solvent: methoxypropylacetate/methoxypropanol, commercially obtained from BYK, Germany), 30.8 weight parts of an acrylate leveling agent (BYK-UV3535, solid content 10%, solvent: ethyl acetate, commercially obtained from BYK, Germany), 6.54 weight parts of hydrophilic methyl methacrylate-styrene copolymer microparticles (particle diameter 2 μm, refractive index 1.55, commercially obtained from Seikisui Plastics, Japan) and 217 weight parts of ethyl acetate and 283 weight parts of n-butyl acetate were mixed and stirred for 1 hour. The resulting solution was wirebar-coated on a PMMA film with a thickness of 40 μm. After the coating layer was dried at 100° C. for 30 seconds in an oven, the layer was cured by exposure to UV light in a cumulative dosage of 40 mJ/cm$^2$ under nitrogen atmosphere. Thus, an anti-glare hard coating film comprising an anti-glare hard coat layer with a thickness of 3.3 μm formed on the substrate was obtained.

Preparation Example 4: Preparation of the Anti-Glare Hard Coating Film 300 weight parts of hard coating solution prepared in Preparation Example 3, 13.8 weight parts of reactive silica nanoparticles dispersion (MEK-5630X, solid content 30%, solvent: butanone, commercially obtained from EVONIK United Silica Industrial, Taiwan), 15.5 weight parts of an acrylate leveling agent (BYK-UV3535, solid content 10%, solvent: ethyl acetate, commercially obtained from BYK, Germany), 2.46 weight parts of hydrophilic methyl methacrylate-styrene copolymer microparticles (particle diameter 2 μm, refractive index 1.55, commercially obtained from Seikisui Plastics, Japan), 40.5 weight parts of ethyl acetate (EAC), 70.5 weight parts of n-butyl acetate (nBAC) and 70.5 weight parts of iso-butyl alcohol were mixed and stirred for 1 hour. The resulting solution was wirebar-coated on a PMMA film with a thickness of 40 μm. After the coating layer was dried at 100° C. for 30 seconds in an oven, the layer was cured by exposure to UV light in a cumulative dosage of 40 mJ/cm$^2$ under nitrogen atmosphere. Thus, an anti-glare hard coating film comprising an anti-glare hard coat layer with a thickness of 5.6 μm formed on the substrate was obtained.

Example 1 Preparation of the Anti-Reflective Film 91.25 weight parts of pentaerythritol triacrylate (PETA), 8.75 weight parts of a photoinitiator (KIP-160, commercially obtained from IGM Resin, Netherland), 45 weight parts of the mixture of the perfluoropolyether group-containing (meth)acrylic-modified organosilicone compounds represented by formula (I) and (II) (KY-1203, solid content 20%, solvent: methyl isobutyl ketone, commercially obtained from Shin-Etsu Chemical, Japan), 438 weight of hollow silica nanoparticles dispersion (Thrulya 4320, solid content 20%, particle diameter 60 nm, solvent: methyl isobutyl ketone, commercially obtained from JGC Catalysts and Chemicals, Japan), 200 weight parts of ethyl acetate (EAC), 200 weight parts of n-butyl acetate (nBAC), 3442 weight parts of methyl isobutyl ketone (MIBK) and 5365 weight parts of propylene glycol methyl ether (PGME) were mixed and stirred for 10 minutes to generate a low refractive solution.

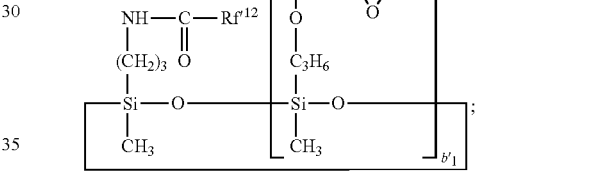

Formula (I)

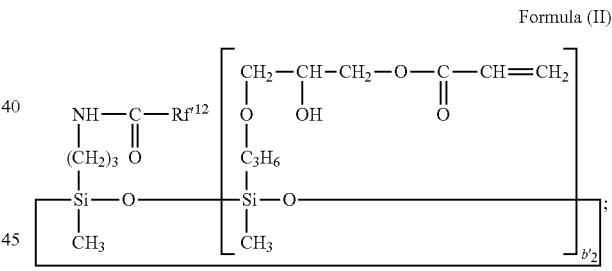

Formula (II)

wherein b'$_1$+b'$_2$ is ranging between 2 and 6.5, and Rf$^{12}$ is represented by the following formula:

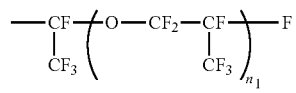

wherein n1 is ranging between 2 and 100.

Then, the low refractive solution was coated on the hard coating film of Preparation Example 1 by a bar coater to formed a low refractive coating film thereon. The resulting low refractive coating film was dried at 80° C. in an oven for 2 minutes and, then cured by exposure to UV radiation in a cumulative dosage of 350 mJ/cm$^2$ by in an atmosphere of nitrogen. An anti-reflective film was obtained comprising a low refractive layer with a thickness of 0.13 μm coated on the hard coating layer. The optical properties, reflectivity and abrasion resistance of the resulting anti-reflective film were determined and the results thereof were shown in table 1.

Example 2 Preparation of the Anti-Reflective Film

An anti-reflective film was prepared by the procedures same as Example 1, except that the hard coating film of Preparation Example 1 is replaced by the hard coating film of the Preparation Example 2. The optical properties, reflectivity and abrasion resistance of the resulting anti-reflective film were determined and the results thereof were shown in table 1.

Example 3: Preparation of the Anti-Reflective Film

An anti-reflective film was prepared by the procedures same as in Example 1, except that the hard coating film of Preparation Example 1 is replaced by the antiglare hard coating film of this Preparation Example 3. The optical properties, reflectivity and abrasion resistance of the resulting anti-reflective film were determined and the results thereof were shown in table 2.

Example 4: Preparation of the Anti-Reflective Film

An anti-reflective film was prepared by the procedures same as Example 3, except that the contents of PETA and the photoinitiator (KIP-160, commercially obtained from IGM Resin, Netherland) of the low refractive layer were changed to 97.75 weight parts and 2.25 weight parts, respectively. The optical properties, reflectivity and abrasion resistance of the resulting anti-reflective film were determined and the results thereof were shown in table 2.

Example 5: Preparation of the Anti-Reflective Film

An anti-reflective film was prepared by the procedures same as Example 3, except that the content of the mixture of the perfluoropolyether group-containing (meth)acrylic-modified organosilicone compounds of the low refractive solution (KY-1203, solid content 20%, solvent: methyl isobutyl ketone, commercially obtained from Shin-Etsu Chemical, Japan) was changed to 60 weight parts. The optical properties, reflectivity and abrasion resistance of the resulting anti-reflective film were determined and the results thereof were shown in table 2.

Example 6: Preparation of the Anti-Reflective Film

An anti-reflective film was prepared by the procedures same as in Example 3, except that the contents of PETA and the photoinitiator (KIP-160, commercially obtained from IGM Resin, Netherland) of the low refractive layer were changed to 86 weight parts and 14 weight parts, respectively. The optical properties, reflectivity and abrasion resistance of the resulting anti-reflective film were determined and the results thereof were shown in table 2.

Example 7: Preparation of the Anti-Reflective Film

An anti-reflective film was prepared by the procedures same as Example 3, except that the content of the mixture of perfluoropolyether group-containing (meth)acrylic-modified organosilicone compounds (KY-1203, solid content 20%, solvent: methyl isobutyl ketone, commercially obtained from Shin-Etsu Chemical, Japan) of the low refractive solution was changed to 75 weight parts. The optical properties, reflectivity and abrasion resistance of the resulting anti-reflective film were determined and the results thereof were shown in table 2.

Example 8: Preparation of the Anti-Reflective Film

An anti-reflective film was prepared by the procedures same as Example 3, except that the anti-glare hard coating film of Preparation Example 3 was replaced by the anti-glare hard coating film of Preparation Example 4. The optical properties, reflectivity and abrasion resistance of the resulting anti-reflective film were determined and the results thereof were shown in table 2.

Comparative Example 1: Preparation of the Anti-Reflective Film

An anti-reflective film was prepared by the procedures same as in Example 3, except that the content of the pentaerythritol triacrylate (PETA) of the low refractive solution was changed to 99.00 weight parts, and the content of the photoinitiator (KIP-160, commercially obtained from IGM Resin, Netherland) of the low refractive solution was changed to 1 weight parts. The optical properties, reflectivity and abrasion resistance of the resulting anti-reflective film were determined and the results thereof were shown in table 3.

Comparative Example 2: Preparation of the Anti-Reflective Film

An anti-reflective film was prepared by the procedures same as in Example 3, except that the content of the pentaerythritol triacrylate (PETA) of the low refractive solution was changed to 82.5 weight parts and the content of the photoinitiator (KIP-160, commercially obtained from IGM Resin, Netherland) of the low refractive solution was changed to 17.5 weight parts. The optical properties, reflectivity and abrasion resistance of the resulting anti-reflective film were determined and the results thereof were shown in table 3.

Comparative Example 3: Preparation of the Anti-Reflective Film

An anti-reflective film was prepared by the procedures same as in Example 3, except that the content of the leveling agent, perfluoropolyether group-containing (meth)acrylic-modified organosilicone compound (KY-1203, solid content 20%, solvent: methyl isobutyl ketone, commercially obtained from Shin-Etsu Chemical, Japan) of the low refractive solution was changed to 15 weight parts. The optical properties, reflectivity and abrasion resistance of the resulting anti-reflective film were determined and the results thereof were shown in table 3.

Comparative Example 4 Preparation of the Anti-Reflective Film

An anti-reflective film was prepared by the procedures same as in Example 3, except that the leveling agent, perfluoropolyether group-containing (meth)acrylic-modified organosilicone compound, of the low refractive solution was replaced with acryl-modified silicone (GL-04R, solid content 20%, solvent: butyl acetate, commercially obtained from Kyoeisha Chemical, Japan). The optical properties, reflectivity and abrasion resistance of the resulting anti-reflective film were determined and the results thereof were shown in table 3.

Comparative Example 5 Preparation of the Anti-Reflective Film

An anti-reflective film was prepared by the procedures same as in Example 3, except that the leveling agent, perfluoropolyether group-containing (meth)acrylic-modified organosilicone compound, was replaced with 22.5 weight parts of fluorine-containing acrylate (Megaface RS-56, solid content 40%, solvent: methyl isobutyl ketone, commercially obtained from DIC, Japan). The optical properties, reflectivity and abrasion resistance of the resulting anti-reflective film were determined and the results thereof were shown in table 3.

Optical Property Measurement

The optical properties of the anti-reflective film obtained from the Examples and Comparative Examples were measured according to JIS test methods, wherein the Haze was measured according to the test method of JIS K7136 by NDH-2000 Haze Meter (manufactured by Nippon Denshoku Industries, Japan), and the light transmittance was measured according to the test method of JIS K7361 by NDH-2000 Haze Meter (manufactured by Nippon Denshoku Industries, Japan).

Reflectivity Measurement

The Reflectivity of the anti-reflective films obtained from the Examples and Comparative Examples were obtained by adhering the anti-reflective films to a black plate and measuring the average reflectivity thereof by Hitachi U-4100 spectrometer at wavelengths from 380 to 780 nm.

Abrasion Resistance Test

The surface of the anti-reflective films obtained from the Examples and Comparative Examples were rubbed by steel wood #0000 with a load of 500 g/cm² and 1000 g/cm² for 10 times to check if scratches were made on the film surface by observation. The evaluation criteria were as below.

⊚: No scratched
○: 1-4 scratches were made
Δ: 1-14 scratches were made
X: Above 15 scratches were made

TABLE 1

The properties of the anti-reflective films of Example 1 and Example 2

|  | Haze (%) | Light Transmittance (%) | Reflectivity (%) | Abrasion Resistance (500 g) |
|---|---|---|---|---|
| Example 1 | 0.89 | 94.54 | 1.26 | ⊚ |
| Example 2 | 0.78 | 94.73 | 1.36 | ⊚ |

TABLE 2

The properties of the anti-reflective films of Example 3 to Example 8

|  | Haze (%) | Light Transmittance (%) | Reflectivity (%) | Abrasion Resistance (500 g) | Abrasion Resistance (1000 g) |
|---|---|---|---|---|---|
| Example 3 | 3.05 | 94.74 | 1.38 | ⊚ | ⊚ |
| Example 4 | 3.01 | 94.64 | 1.30 | ⊚ | ⊚ |
| Example 5 | 2.96 | 94.71 | 1.32 | ⊚ | ⊚ |
| Example 6 | 3.04 | 94.63 | 1.30 | ⊚ | ○ |

TABLE 2-continued

The properties of the anti-reflective films of Example 3 to Example 8

|  | Haze (%) | Light Transmittance (%) | Reflectivity (%) | Abrasion Resistance (500 g) | Abrasion Resistance (1000 g) |
|---|---|---|---|---|---|
| Example 7 | 3.03 | 94.74 | 1.31 | ⊚ | ○ |
| Example 8 | 2.80 | 94.70 | 1.32 | ⊚ | ⊚ |

TABLE 3

The properties of the anti-reflective films of Comparative Example 1 to Comparative Example 5

|  | Haze (%) | Light Transmittance (%) | Reflectivity (%) | Abrasion Resistance (500 g) | Abrasion Resistance (1000 g) |
|---|---|---|---|---|---|
| Comparative Example 1 | 3.01 | 94.62 | 1.29 | ○ | Δ |
| Comparative Example 2 | 3.11 | 94.64 | 1.35 | ○ | Δ |
| Comparative Example 3 | 2.94 | 94.70 | 1.33 | ○ | X |
| Comparative Example 4 | 3.03 | 94.64 | 1.37 | Δ | X |
| Comparative Example 5 | 3.08 | 94.60 | 1.37 | Δ | X |

As the results shown in Tables 1 to 3, the abrasion resistance of the anti-reflective films of Examples 1 to 8 is better than that of the anti-reflective films of the Comparative Examples. Especially, the anti-reflective films of Examples 3 to 5 and Example 8 can pass the abrasion resistance test at a load of 1000 g/cm² without any scratch of abrasion on the surface. The anti-reflective films of the present invention exhibit an enhanced abrasion resistance without sacrificing the optical properties thereof.

According to the anti-reflective film of the above Examples, the present invention is further to provide a polarizer comprising a polarizing element, wherein the polarizer comprises an anti-reflective film as above thereon.

According to the anti-reflective film and polarizer of the above Examples, the present invention is further to provide a display comprising an anti-reflective film and/or polarizer as above on the surface of the display.

While the invention has been described by way of example(s) and in terms of the embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An anti-reflective film comprising:
    a substrate;
    a cured hard coating layer coated on the substrate, wherein the cured hard coating layer is formed by curing a curable composition comprising a urethane (meth)acrylate oligomer, an initiator, a plurality of organic micro particles, and a plurality of silica nanoparticles; and
    a low refractive layer on the hard coating layer;
    wherein the low refractive layer comprises a (meth) acrylate resin, a plurality of hollow silica nanoparticles, an initiator, and a leveling agent comprising a mixture of perfluoropolyether group-containing (meth)acrylic-modified organosilicone compounds represented by the following formulas (I) and (II):

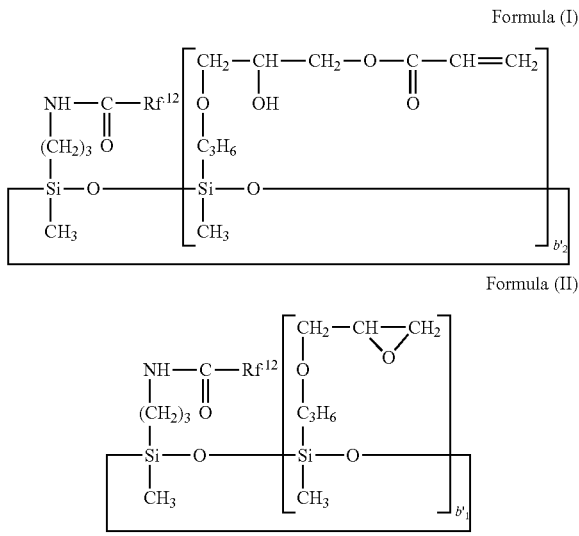

wherein $b'_1+b'_2$ is ranging between 2 and 6.5, and $Rf^{12}$ is the group represented by the following formula:

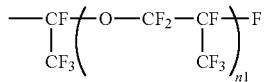

wherein n1 is ranging between 2 and 100;
wherein the reflectivity of the anti-reflective film is ranging between 1.2% and 1.4%.

2. The anti-reflective film as claimed in claim 1, wherein the number average molecular weight (Mn) of the perfluoropolyether group-containing (meth)acrylic-modified organosilicone compound is ranging between 1,500 and 16,000.

3. The anti-reflective film as claimed in claim 1, wherein the amount of the leveling agent used in low refractive layer is ranging from 5 weight parts to 20 weight parts relative to per 100 weight parts of (meth)acrylate resin.

4. The anti-reflective film as claimed in claim 1, wherein the (meth)acrylate resin is selected from at least one of the group consisting of pentaerythritol tri(meth)acrylate, dipentaerythritol hexa(meth) acrylate, pentaerythritol tetra(meth) acrylate, dipentaerythritol penta(meth)acrylate, trimethylolpropane tri(meth)acrylate, ditrimethylolpropane tetra(meth) acrylate and dipentaerythritol tetra(meth)acrylate, or combinations thereof.

5. The anti-reflective film as claimed in claim 1, wherein the particle diameter of the hollow silica nanoparticles used in the low refractive layer is from 50 nm to 100 nm.

6. The anti-reflective film as claimed in claim 1, wherein the amount of the hollow silica nanoparticles used in the low refractive layer is ranging from 60 weight parts to 130 weight parts relative to per 100 weight parts of (meth) acrylate resin.

7. The anti-reflective film as claimed in claim 1, wherein the amount of the initiator used in the low refractive layer is ranging from 1.5 weight parts to 20 weight parts relative to per 100 weight parts of (meth)acrylate resin.

8. The anti-reflective film as claimed in claim 1, wherein the initiator used in the low refractive layer is selected from at least one of the group consisting of hydroxycyclohexyl phenyl ketone, diphenyl(2,4,6-trimethylbenzyl)phosphine oxide, 2-hydroxy-2-methyl-1-phenyl-1-propanone, 2-methyl-1-[4-(methylthio)phenyl]-2-morpholinopropan-1-one, oligo[2-hydroxy-2-methyl-1-[4-(1-methylvinyl)phenyl propanone] and 2-hydroxy-1-[4-[4-(2-hydroxy-2-methyl-propanoyl)phenoxy]phenyl]-2-methylpropan-1-one, or combinations thereof.

9. The anti-reflective film as claimed in claim 1, wherein the number molecular weight of the urethane(meth)acrylate oligomer is greater than 1,800.

10. The anti-reflective film as claimed in claim 1, wherein the viscosity of the urethane(meth)acrylate oligomer at 25° C. is greater than 45,000 cps.

11. A polarizer comprising a polarizing element, wherein the polarizer comprises an anti-reflective film as claimed in claim 1 formed thereon.

12. A display comprising an anti-reflective film as claimed in claim 1.

* * * * *